(12) United States Patent  (10) Patent No.: US 7,937,509 B2
Yamanashi  (45) Date of Patent: May 3, 2011

(54) CONTENT PROCESSING APPARATUS AND CONTENT PROCESSING METHOD

(75) Inventor: Naoki Yamanashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/626,195

(22) Filed: Nov. 25, 2009

(65) Prior Publication Data

US 2010/0138570 A1    Jun. 3, 2010

(30) Foreign Application Priority Data

Nov. 28, 2008  (JP) ................................. 2008-304831

(51) Int. Cl.
G06F 13/00 (2006.01)
G06F 15/173 (2006.01)

(52) U.S. Cl. .......................................... 710/41; 709/223

(58) Field of Classification Search ................... 710/41; 709/223

See application file for complete search history.

(56) References Cited

U.S. PATENT DOCUMENTS

| | | | | |
|---|---|---|---|---|
| 5,596,502 A | * | 1/1997 | Koski et al. ..................... | 700/95 |
| 7,162,535 B2 | * | 1/2007 | Kustov et al. ................... | 709/235 |
| 7,493,436 B2 | * | 2/2009 | Blackmore et al. ............. | 710/260 |
| 2001/0026591 A1 | * | 10/2001 | Keren et al. ..................... | 375/240.26 |
| 2007/0245010 A1 | * | 10/2007 | Arn et al. ........................ | 709/223 |
| 2007/0250901 A1 | * | 10/2007 | McIntire et al. ................ | 725/146 |
| 2008/0120404 A1 | | 5/2008 | Sakai | |

FOREIGN PATENT DOCUMENTS

| | | |
|---|---|---|
| JP | 10-275418 | 10/1998 |
| JP | 2000-100065 | 4/2000 |
| JP | 2001-76423 | 3/2001 |
| JP | 2002-232846 | 8/2002 |
| JP | 2002-298551 | 10/2002 |
| JP | 2002-305706 | 10/2002 |
| JP | 2005-190639 | 7/2005 |
| JP | 2005-318321 | 11/2005 |
| JP | 2007-058816 | 3/2007 |
| JP | 2007-116214 | 5/2007 |
| JP | 2008-28659 | 2/2008 |
| JP | 2008-052817 | 3/2008 |
| JP | 2008-129758 | 6/2008 |

* cited by examiner

*Primary Examiner* — Henry W Tsai
*Assistant Examiner* — Hyun Nam
(74) *Attorney, Agent, or Firm* — Blakely, Sokoloff, Taylor & Zafman LLP (57) ABSTRACT

According to one embodiment, a content processing apparatus has an interface circuit connected to one or more external devices, and a control circuit which executes plural kinds of content processing to access the one or more external devices simultaneously and in parallel. The control circuit includes a CPU configured to set an order of priority for plural kinds of content processing, and limit processing operation sequentially from lower priority content processing, as load increases and disables simultaneous parallel execution of plural kinds of content processing.

2 Claims, 8 Drawing Sheets

| Priority | Kinds of content processing requested for TV |
|---|---|
| 1 | Recording to an HDD |
| 2 | Reproducing from an HDD, or reproducing from a media server |
| 3 | Transmission as a media server |
| 4 | Movement between HDD, movement from an HDD to a media server, or movement as a media server |

F I G. 10

CONTENT PROCESSING APPARATUS AND CONTENT PROCESSING METHOD

CROSS-REFERENCE TO RELATED APPLICATIONS

This application is based upon and claims the benefit of priority from Japanese Patent Application No. 2008-304831, filed Nov. 28, 2008, the entire contents of which are incorporated herein by reference.

BACKGROUND

1. Field

One embodiment of the present invention relates to a content processing apparatus, and a content processing method, for simultaneous parallel execution of various processes for various content, such as recording, reproduction, and movement. In particular, the present invention relates to a content processing apparatus, and a content processing method, which reproduce a received broadcast content for example, while recording the content on an external hard disk drive (HDD).

2. Description of the Related Art

Television broadcast has been digitalized in recent years. For example, in Japan, terrestrial digital broadcasting has started in addition to digital direct broadcasting by satellites (DBS) such as broadcasting satellite (BS) and 110° communication satellite (CS).

A conventional digital television broadcast receiver connectable to a hard disk (LAN-HDD) through a network is known (refer to Jpn. Pat. Appln. KOKAI Publication No. 2008-28659). This conventional broadcast receiver has a "follow-up replay" function, which records digital video and audio data of a received broadcast content (i.e., a program title) on a hard disk on a network, simultaneously with and in parallel with reproduction of the digital video and audio data recorded on the hard disk.

The Jpn. Pat. Appln. KOKAI Publication No. 2008-28659 discloses a measurement technique for measuring a communication speed of recording and reproducing data to specify content that can be stably followed-up replayed by using a hard disk connected to a network. However, this measurement technique is not adaptable to a situation, in which processing depends on operating speeds and processing capacities of various kinds of external apparatus connected as an option, and normal processing is difficult. As a general-purpose external device, there is a network attached storage (NAS), a universal serial bus (USB)-HDD, a DVD recorder, a content server, etc. For example, when reproduction from an HDD is executed simultaneously and in parallel with transmission of content as a media server, normal processing is ensured if the HDD is a built-in HDD or a special specified HDD. But, if the HDD is a universal external device such as a USB-HDD or NAS, processing depends on a speed of reading/writing an HDD and a CPU power used for reading/writing an HDD, and processing may fail.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

According to one embodiment of invention, there is provided a content processing apparatus comprising: an interface circuit connected to one or more external devices; and a processor configured to execute plural kinds of content processing to access the one or more external devices simultaneously and in parallel, the processor including a controller configured to set the order of priority for plural kinds of content processing, and limit processing operation sequentially from lower priority content processing, as load increases and disables simultaneous parallel execution of plural kinds of content processing.

According to one embodiment of invention, there is provided a content processing method of executing plural kinds of content processing to access one or more external devices simultaneously and in parallel, the method comprising: setting the order of priority for plural kinds of content processing, and limiting processing operation sequentially from lower priority content processing, as load increases and disables simultaneous parallel execution of plural kinds of content processing.

In the content processing apparatus and method, an order of priority is set for plural kinds of content processing, processing operation is limited sequentially from lower priority content processing, as load increases and disables simultaneous parallel execution of plural kinds of content processing. As the load is decreased by this limitation, failure of processing can be avoided.

Hereinafter, an explanation will be given of a content processing apparatus according to one embodiment of the invention. The content processing apparatus has functions of a personal video recorder (PVR) and media server, and is configured as a digital television broadcast receiver for simultaneous parallel execution of plural kinds of processing such as recording, reproduction and movement of broadcast content in cooperation with an external device.

Figure 1:
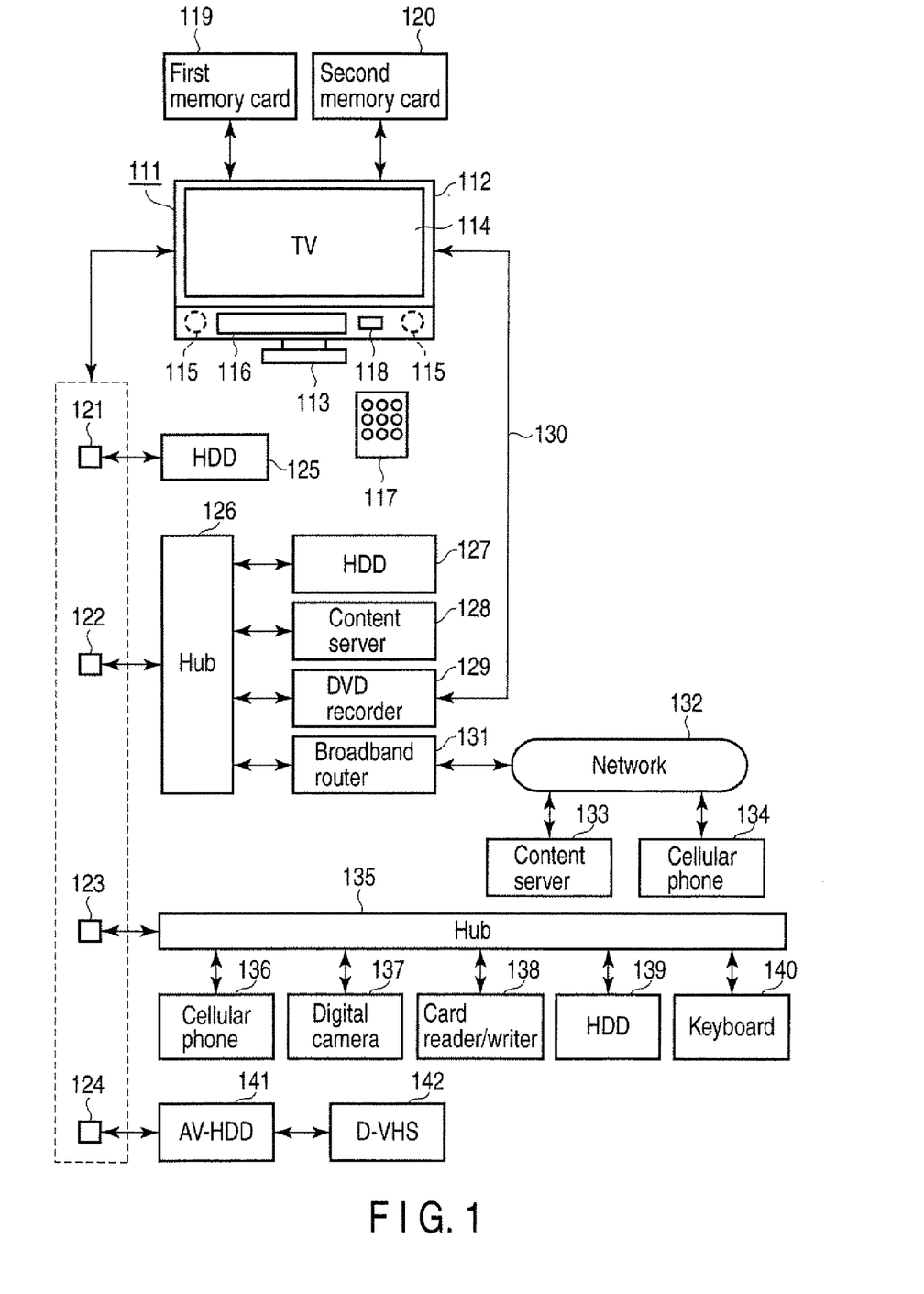
FIG. 1 is an exemplary diagram showing a configuration of a broadcast receiver according to an embodiment of the invention.

FIG. 1 is a schematic diagram showing a configuration of a digital television broadcast receiver (TV) 111. The digital television broadcast receiver consists primarily of a thin-shaped cabinet 112, and a support stand 113 to stand and support the cabinet 112. The cabinet 112 is provided with a flat-panel image display unit 114, consisting of a surface-conduction electron-emitter (SED) display panel, or a liquid crystal display panel, a speaker 115, an operation module 116, a light-receiving module 118 to receive operational information transmitted from a remote controller 117.

The digital television broadcast receiver 111 permits insertion or removal of a first memory card 119 such as a secure digital (SD) memory card, a multimedia card (MMC), and a memory stick. The first memory card 119 is used to record or reproduces TV programs, photographs and other information.

The digital television broadcast receiver 111 permits insertion or removal of a second memory card (IC card) 120 storing contracting information, for example. The second memory card 120 is used to record or reproduce information.

The digital television broadcast receiver 111 has a first local area network (LAN) terminal 121, a second local area network (LAN) terminal 122, a Universal Serial Bus (USB) terminal 123, and an i. LINK terminal 124.

The first LAN terminal 121 is used as a LAN-compatible HDD port, and is used for recording or reproducing information through Ethernet (registered trademark) for the LAN-compatible HDD (LAN-HDD) 125 that is a network attached storage (NAS) connected to LAN.

As the first LAN terminal 121 is provided as a LAN-compatible HDD port, program information can be stably recorded on the LAN-compatible HDD 125 with high-definition quality without being influenced by other network environments or network conditions of use.

The second LAN terminal 122 is provided as a general LAN-compatible port using Ethernet, and is used to connect a LAN-compatible HDD (LAN-HDD) 127, a content server 128, or a digital versatile disk (DVD) recorder 129 having a built-in HDD, for transmitting data to these devices.

The content server 128 has a function as a content server in home networking, and is configured as an universal plug and play (UPnP) compatible device provided with an information providing service necessary to access content.

As the digital information transmitted through the second LAN terminal 122 includes only control information, the DVD recorder 129 needs to have an exclusive analog transmission line 130 for transmitting analog video and audio information to the digital television broadcast receiver 111.

Further, the second LAN terminal 122 is connected to a network 132 such as the Internet through a broadband router 131 connected to a hub 126, and is used for transmitting data to the content server 133 and a cellular phone 134, for example, through the network 132.

The content server 133 is provided on the Internet by a content provider, and is configured to operate as a server, which opens a website having various content to the public, and delivers content from a website, and as a UPnP-compatible device provided with a service to supply URI information needed to access content.

The USB terminal 123 is used as a general USB-compatible port, and is used to connect USB devices such as a cellular phone 136, a digital camera 137, a card reader/writer 138 for a memory card, an HDD (USB-HDD) 139, and a keyboard 140, through a hub 135, for example, and is used to transmit information to these USB devices.

The i. LINK terminal 124 is used to make serial connection to an AV-HDD 141 and a D (digital)-VHF (video home system) 142, for example, for transmitting data to these devices.

Figure 2:
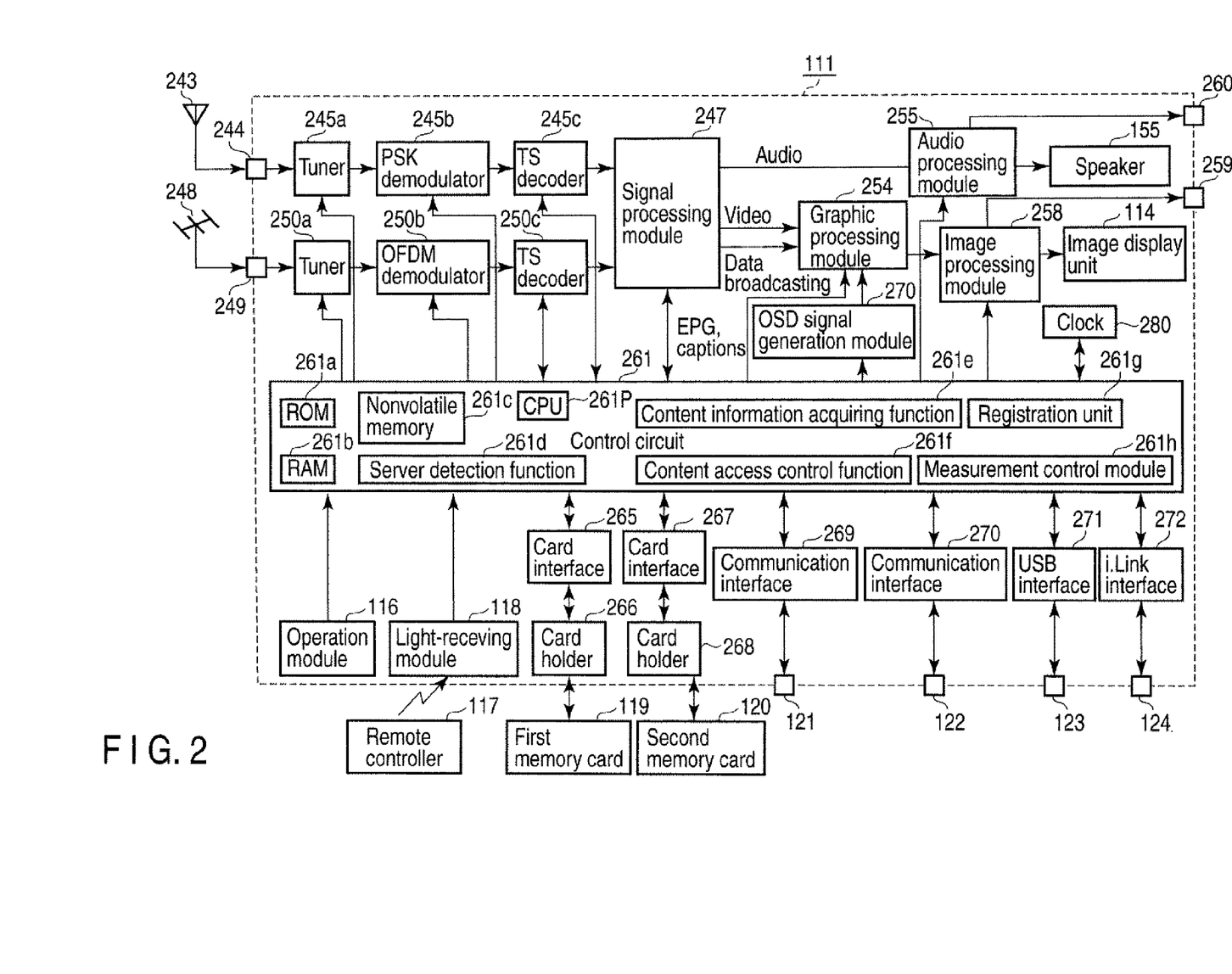
FIG. 2 is an exemplary diagram showing a main signal processing system of a digital television broadcast receiver shown in FIG. 1.

FIG. 2 shows a main signal processing system of the digital television broadcast receiver 111.

Namely, a signal of a satellite digital television broadcast received through a digital DBS (BS/CS) antenna 243 is supplied to a digital DBS tuner 245a.

The tuner 245a tunes in a broadcast signal of a desired channel by a control signal from a control circuit (processor) 261, and outputs the tuned broadcast signal to a phase shift keying (PSK) demodulator 245b.

The PSK demodulator 245b demodulates the broadcast signal tuned by the tuner 245a according to a control signal from the control circuit 261, obtains a transport stream including a desired program, and outputs it to a TS decoder 245c.

The TS decoder 245c decodes a transport stream (TS) multiplexed signal to a transport stream (TS) according to a control signal from the control circuit 261, and outputs a packetized elementary stream (PES) obtained by de-packetizing digital video and audio signals of a desired program, to a STD buffer 247f in the signal processing module 247.

The TS decoder 245c outputs section information sent from digital broadcasting, to a section processing module 247h in the signal processing module 247.

A terrestrial digital television broadcast signal received through an antenna 248 for receiving a terrestrial digital broadcast is supplied to a tuner 250a for terrestrial digital broadcast through an input terminal 249.

The tuner 250a tunes in a broadcast signal of a desired channel by a control signal from the control circuit 261, and outputs the tuned broadcast signal to an orthogonal frequency division multiplexing (OFDM) demodulator 250b.

The OFDM demodulator 250b demodulates the broadcast signal tuned by the tuner 250a according to a control signal from the control circuit 261, obtains a transport stream including a desired program, and outputs it to a TS decoder 250c.

The TS decoder 250c decodes a transport stream (TS) multiplexed signal to a transport stream (TS) by a control signal from the control circuit 261, and outputs a packetized elementary stream (PES) obtained by de-packetizing digital video and audio signals of a desired program, to a STD buffer 247f in the signal processing module 247.

The TS decoder 250c outputs section information sent from digital broadcast, to a section processing module 247h.

The signal processing module 247 selectively performs predetermined digital signal processing for the digital video and audio signals supplied from the TS decoders 245c and 250c, while viewing a TV program, and outputs the processed signal to a graphics processing module 254 and an audio processing module 255. The signal processing module 247 selects a content signal input from the control circuit 261, while reproducing content, and performs digital signal processing to decode a content signal based on one of codecs suitable for the content, and outputs the processed signal to the graphics processing module 254 and audio processing module 255.

The control circuit 261 receives various data for obtaining a broadcast program, electronic program guide (EPG), program attribute information (program category, etc.), and caption information (service information, SI or PSI), from the signal processing module 247.

The control circuit 261 generates an image from the input information for displaying EPG or captions, and outputs the generated image information to the graphics processing module 254.

The section processing module 247h selects various data for obtaining a program, electronic program guide (EPG) information, program attribute information (program category, etc.), or caption information (service information, SI or PSI) from the section information input from the TS decoder 245c (250c), and outputs the selected information to the control circuit 261.

The graphics processing module 254 has a function of combining (1) a digital video signal supplied from an AV decoder in the signal processing module 247, (2) an OSD signal generated by an on-screen display (OSD) signal generation module 257, (3) image data of data broadcasting, (4) an EPG generated by the control circuit 261, and a caption signal, and outputting the combined signal data to the video processing module 256.

Further, when closed captions of close-captioned broadcast are displayed, the graphics processing module 254 superimposes closed caption information on a video signal based on closed caption information from the control circuit 261.

The digital video signal output from the graphics processing module 254 is supplied to the video processing module 258. The video processing module 258 converts the input digital video signal into an analog video signal in a format displayable on the image display unit 114, outputs the converted analog signal to the image display unit 114 to display the signal as an image, and sends the signal to the outside through an output terminal 259.

The audio processing module 255 converts an input digital audio signal into an analog audio signal in a format reproducible through a speaker 115, outputs the converted analog signal to the speaker 115 to reproduce the signal as sound, and sends the signal to the outside through an output terminal 260.

The digital television broadcast receiver 111 generally controls all operations including the receiving operations described above, with the control circuit 261. The control circuit 261 includes a central processing unit (CPU: controller) 261P, receives operational information from the operation module 116, or receives operational information sent from the remote controller 117, through the light-receiving module 118, and controls each part to reflect the contents of operation.

In this case, the control circuit 261 mainly uses a read-only memory (ROM) 261a storing a control program executed by the CPU 261P, a random-access memory (RAM) 261b to provide a working area in the CPU 261P, and a nonvolatile memory 261c to store setting information and control information.

The control circuit 261 is connected to a card holder 266 to hold the first memory card 119, through a card interface 265. Therefore, the control circuit 261 can transmit information to the first memory card 119 inserted into the card holder 266, through the card interface 265.

The control circuit 261 is connected to a card holder 268 to hold the second memory card 120, through a card interface 267. Therefore, the control circuit 261 can transmit information to the second memory card 120 inserted into the card holder 268, through the card interface 267.

The control circuit 261 is connected to a first LAN terminal 121 through a communication interface 269. Therefore, the control circuit 261 can transmit information to the LAN-compatible HDD 125 connected to the first LAN terminal 121, through the communication interface 269. In this case, the control circuit 261 has a function as a dynamic host configuration protocol (DHCP) server, and controls the LAN-compatible HDD 125 connected to the first LAN terminal 121 by assigning an Internet Protocol (IP) address.

The control circuit 261 is connected to a second LAN terminal 122 through a communication interface 270. Therefore, the control circuit 261 can transmit information to the devices connected to the second LAN terminal 122 (refer to FIG. 1), through the communication interface 270.

The control circuit 261 is connected to an USB terminal 123 through an USB interface 271. Therefore, the control circuit 261 can transmit information to the devices connected to the second LAN terminal 123 (refer to FIG. 1), through the USB interface 271.

The control circuit 261 is connected to an i. LINK terminal 124 through an i. LINK interface 272. Therefore, the control circuit 261 can transmit information to the devices connected to the i. LINK terminal 124 (refer to FIG. 1), through the i. LINK interface 272.

In this embodiment, the LAN-compatible HDD 125 stores the storage IDS (including IP addresses and device names) assigned to the HDD 125, HDD 127, content server 128, and DVD recorder 129 at initial registration.

The nonvolatile memory 261c stores the storage IDS of the HDD 125, HDD 127, content server 128, and DVD recorder 129.

The control circuit 261 has (1) a server detecting function module 261d using UPnP, (2) a content information acquiring function module 261e using UpnP, and (3) a content access control function module 261f, which are the functions related to the invention.

The control circuit 261 detects a UPnP-compatible device on a network by using a UPnP discovery function of the server detecting function module 261d. For example, the server detecting function module 261d detects the content server 128 by using the UPnP discovery function.

The control circuit 261 controls a UPnP-compatible device by using a UPnP control function of the content information acquiring function module 261e, and acquires URI information necessary for accessing content in a UPnP-compatible device. For example, the content information acquiring function module 261e controls the content server 128, and acquires URI information necessary for accessing content stored in an HDD in the content server 128, from the content server 128.

The control circuit 261 determines whether access to content is possible by the content access control function module 261f, based on IP address information of a server acquired by the server detecting function module 261d, IP address information obtained from the URI information acquired by the content information acquiring function module 261e, an IP address assigned to a LAN terminal 122 of the digital television broadcast receiver 111, and a netmask. The control circuit 261 causes the image display unit 114 to display OSD to inform that the access to content is permitted when the access is possible, but not permitted when the access is impossible.

Figure 3:
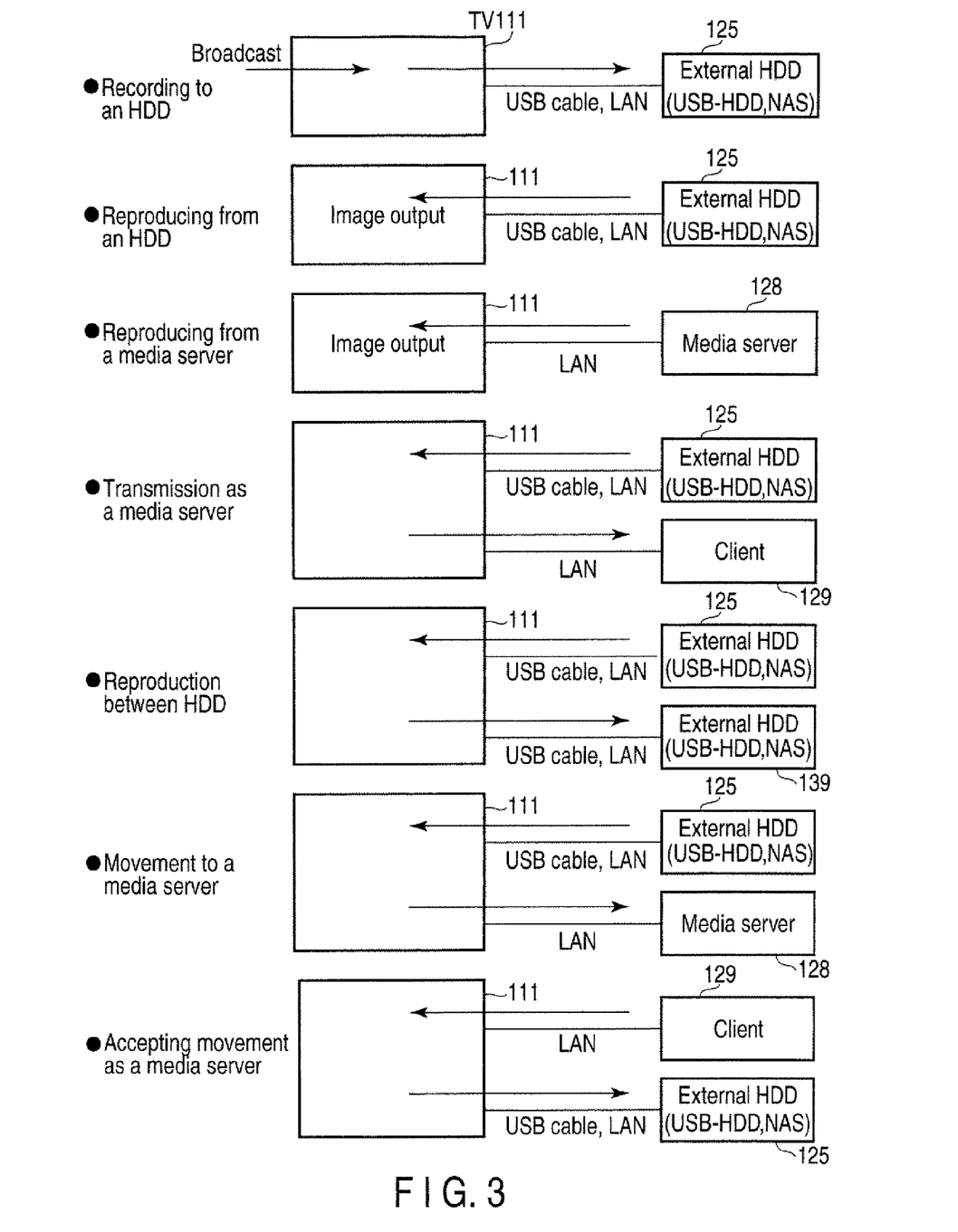
FIG. 3 is a diagram showing examples of kinds of content processing executed in a control circuit shown in FIG. 2.

FIG. 3 shows examples of kinds of content processing executed in the control circuit 261. The content processing selectively includes recording to an HDD, reproducing from an HUD, reproducing from a media server, transmission as a media server, reproduction between HDDs, movement to a media server, and accepting movement as a media server. The HUD described above is the LAN-HDD 125, LAN-HDD 127, USB-HDD 139, or AV-HDD 141, for example. The media server is the TV 111 (control circuit 261), or a content server 128, for example. A client when the TV 111 is used as a content server is the DVD recorder 129, or a computer in not-shown LAN connection. The content processing described above is selected according to the operation of the remote controller 117, for example, and executed simultaneously and in parallel by the CPU 261P.

Figure 4:
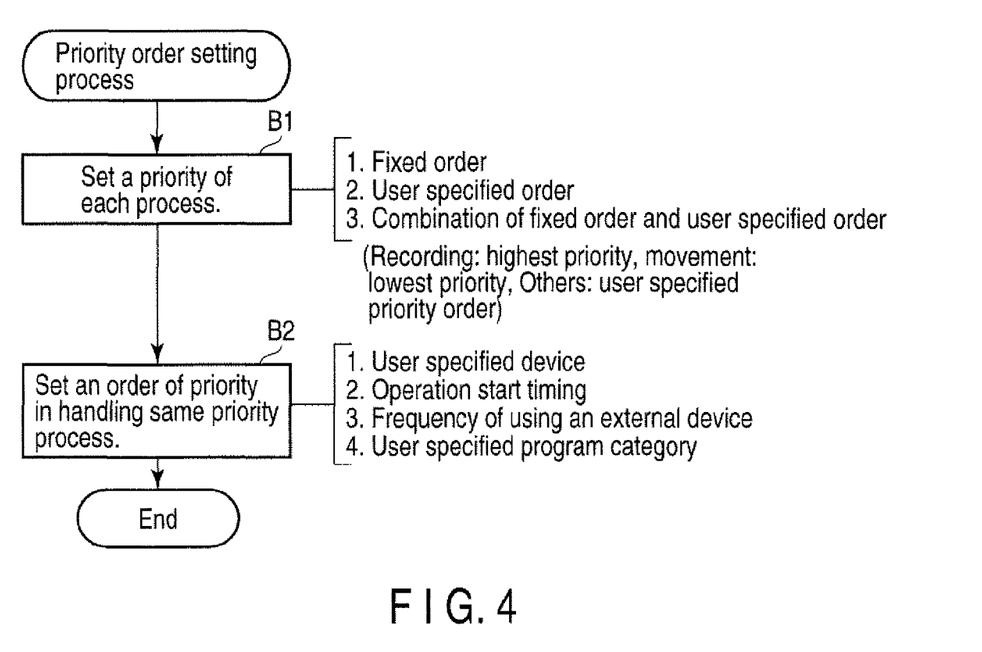
FIG. 4 is an exemplary diagram showing a flowchart of priority order setting for simultaneous parallel execution of various kinds of content processing shown in FIG. 3.

FIG. 4 shows a flowchart of priority order setting for simultaneous parallel content processing. The priority order setting process is executed by the CPU 261P according to the operation of the remote controller 117, for example. When the priority order setting process is started, a priority is set for each process in block 51. In the priority setting for each process, an order of priority is set to (1) a fixed order, (2) a user specified order, or (3) combination of a fixed order and user specified order, for example. In the combination of a fixed order and user specified order, recording is fixed to a highest priority, reproduction is fixed to a lowest priority, and other processing is set to the priorities specified by the user. Then, an order of priority in handling the same priority processing is set in block B2. In this priority setting, an order of priority is set to (1) a user specified device, (2) operation start timing, (3) frequency of using an external device, and (4) user specified program category, for example.

Figure 5:
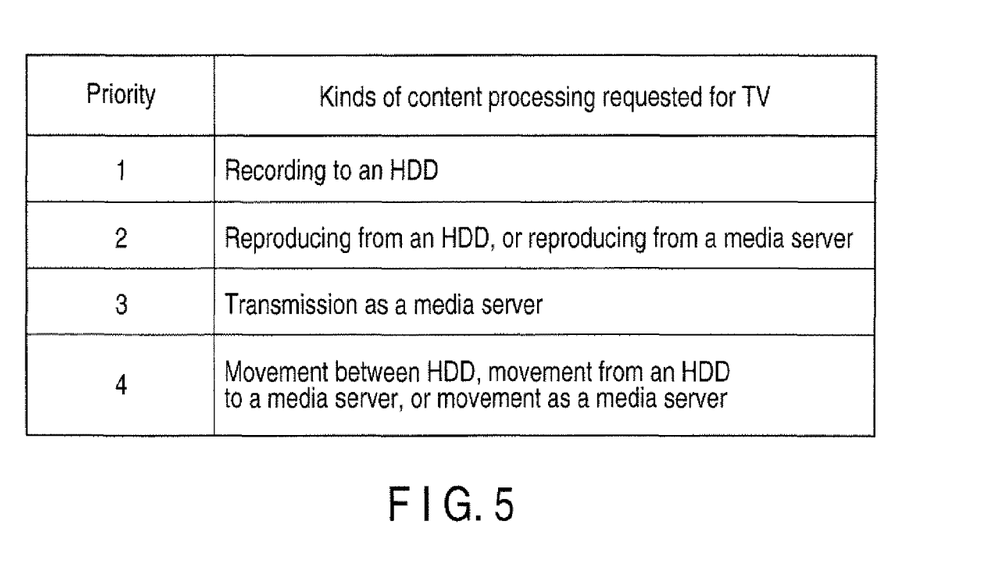
FIG. 5 is a table showing an example of setting a fixed order in the priority order setting process shown in FIG. 4.

FIG. 5 shows an example of setting a fixed order of priority in the priority order setting process. Here, an order of priority is fixed to (1) recording to an HDD, (2) reproducing from an HDD, or reproducing from a media server, (3) transmission as a media server, and (4) movement between HDDs, movement from an HDD to a media server, or movement as a media server. The result of setting is saved as a table in the RAM 261b, for example. The RAM 261b holds a fixed order table as default.

Figure 6:
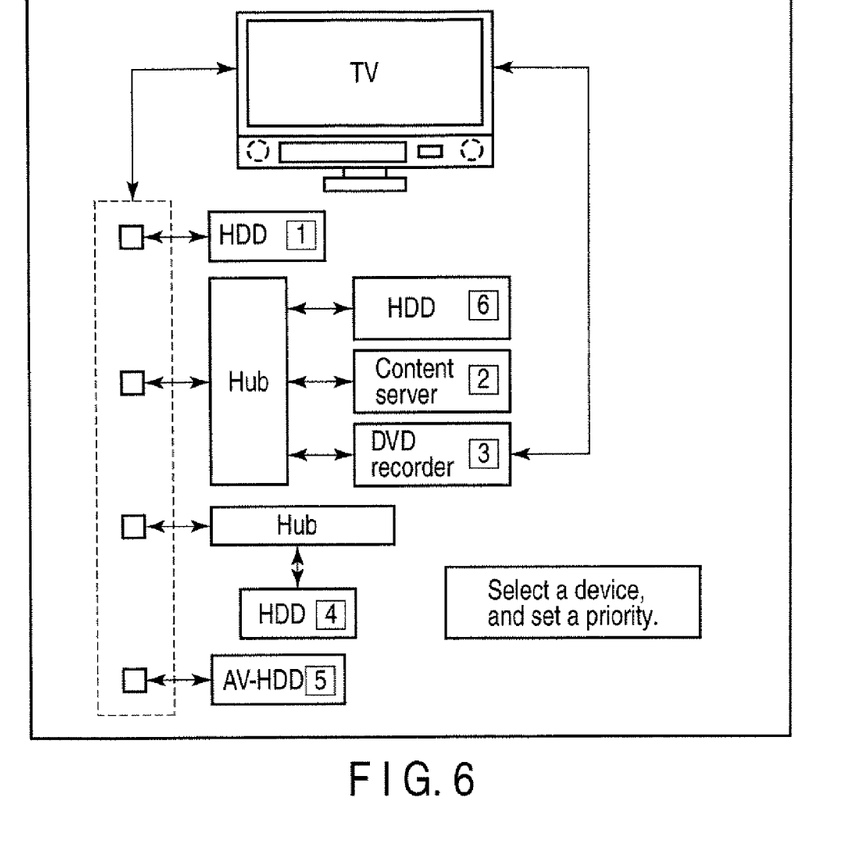
FIG. 6 is an exemplary diagram showing an operation screen for determining the order of priority for devices specified by a user in handling devices with the same priority in the priority order setting process shown in FIG. 4.

FIG. 6 shows an operation screen for determining an order of priority for the devices specified by a user in handling same priority devices. This operation screen is displayed on the image display unit 114. The user selects a device on the operation screen from the remote controller 117, for example, and sets a priority.

Figure 7:
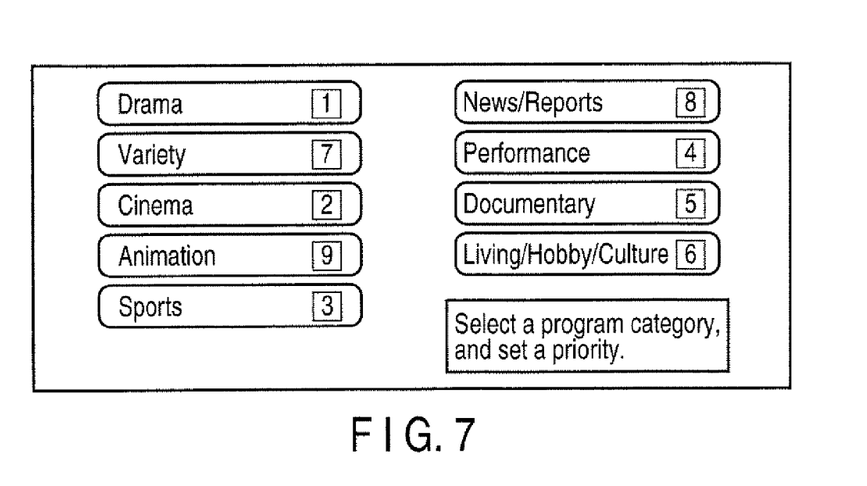
FIG. 7 is an exemplary diagram showing an operation screen for determining the order of priority for program categories specified by a user in handling devices with the same priority in the priority order setting process shown in FIG. 4.

FIG. 7 shows an operation screen for determining an order of priority for the program categories specified by a user in handling same priority devices. This operation screen is displayed on the image display unit 114. The user selects a program category on the operation screen from the remote controller 117, for example, and sets a priority.

Figure 8:
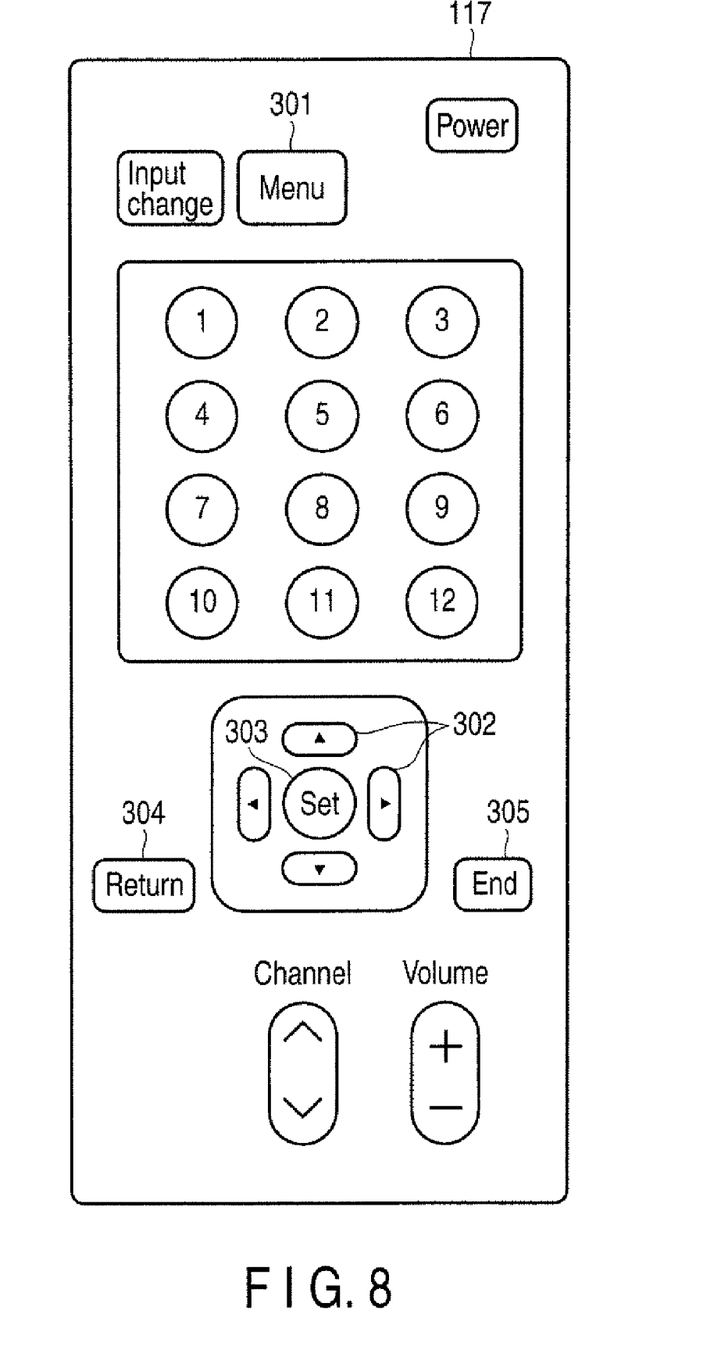
FIG. 8 shows an example of operation buttons provided on a remote controller shown in FIG. 2.

FIG. 8 shows an example of operation buttons provided on the remote controller 117. The remote controller 117 is operated to start the priority order setting process shown in FIG. 4 or the operation screen display shown in FIGS. 6 and 7. The user presses a menu button 301 to display a choice menu, makes a choice with an up/down/left/right button 302, and sets the choice with a set button 303. A return button 304 is pressed to move back a screen display, and an end button 305 is pressed to notify the end of operation.

Figure 9:
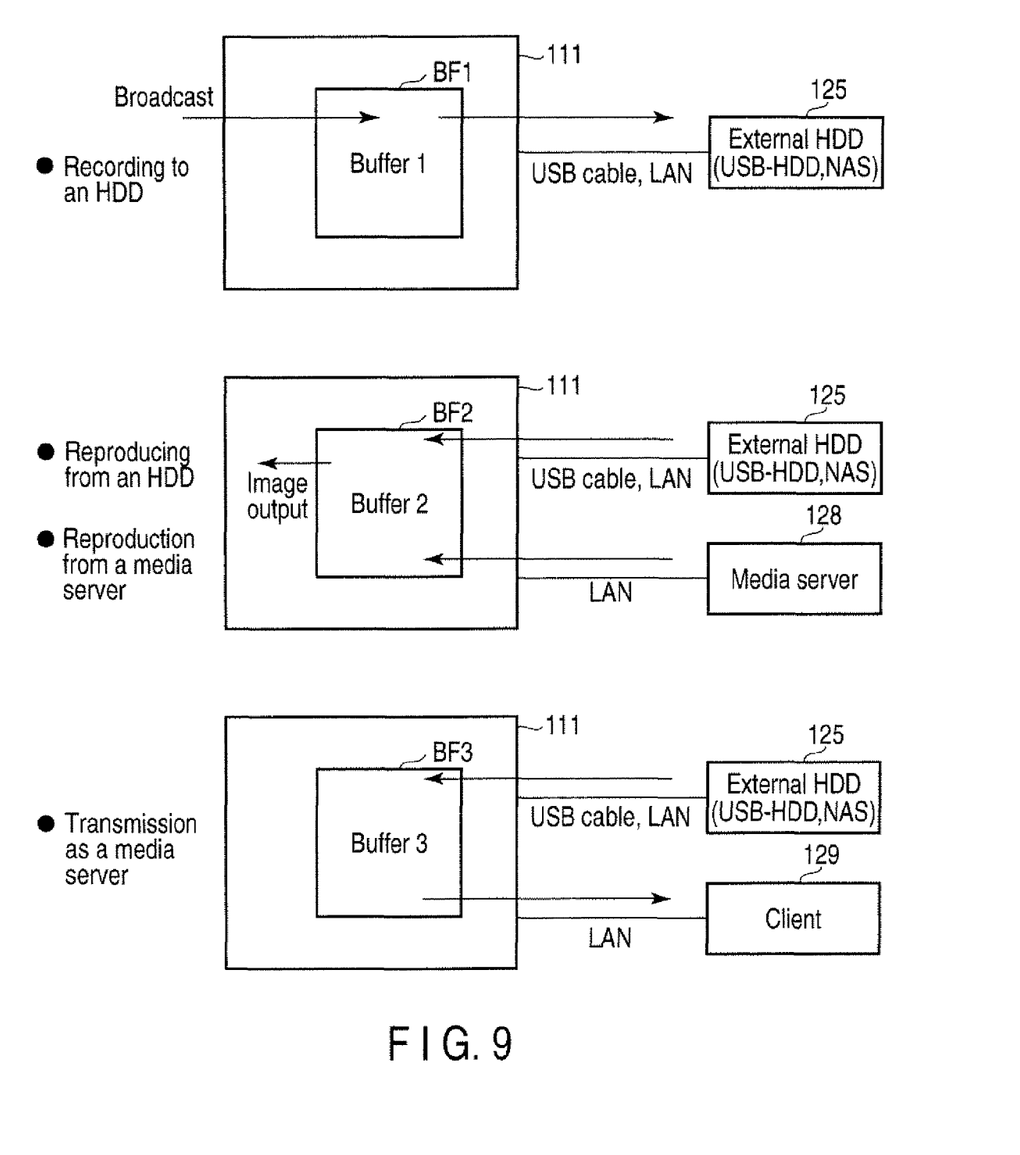
FIG. 9 is an exemplary diagram showing buffers used for various kinds of content processing shown in FIG. 3.

FIG. 9 shows buffers used for various kinds of content processing. The RAM 261b of the TV 111 includes a recording buffer BF1, a reproducing buffer BF2, and a transmission buffer BF3. The recording buffer BF1 is used for recording to an HDD, the reproducing buffer BF2 is used for reproducing from an HDD or a media server, and the transmission buffer BF3 is used for transmission as a media server.

Figure 10:
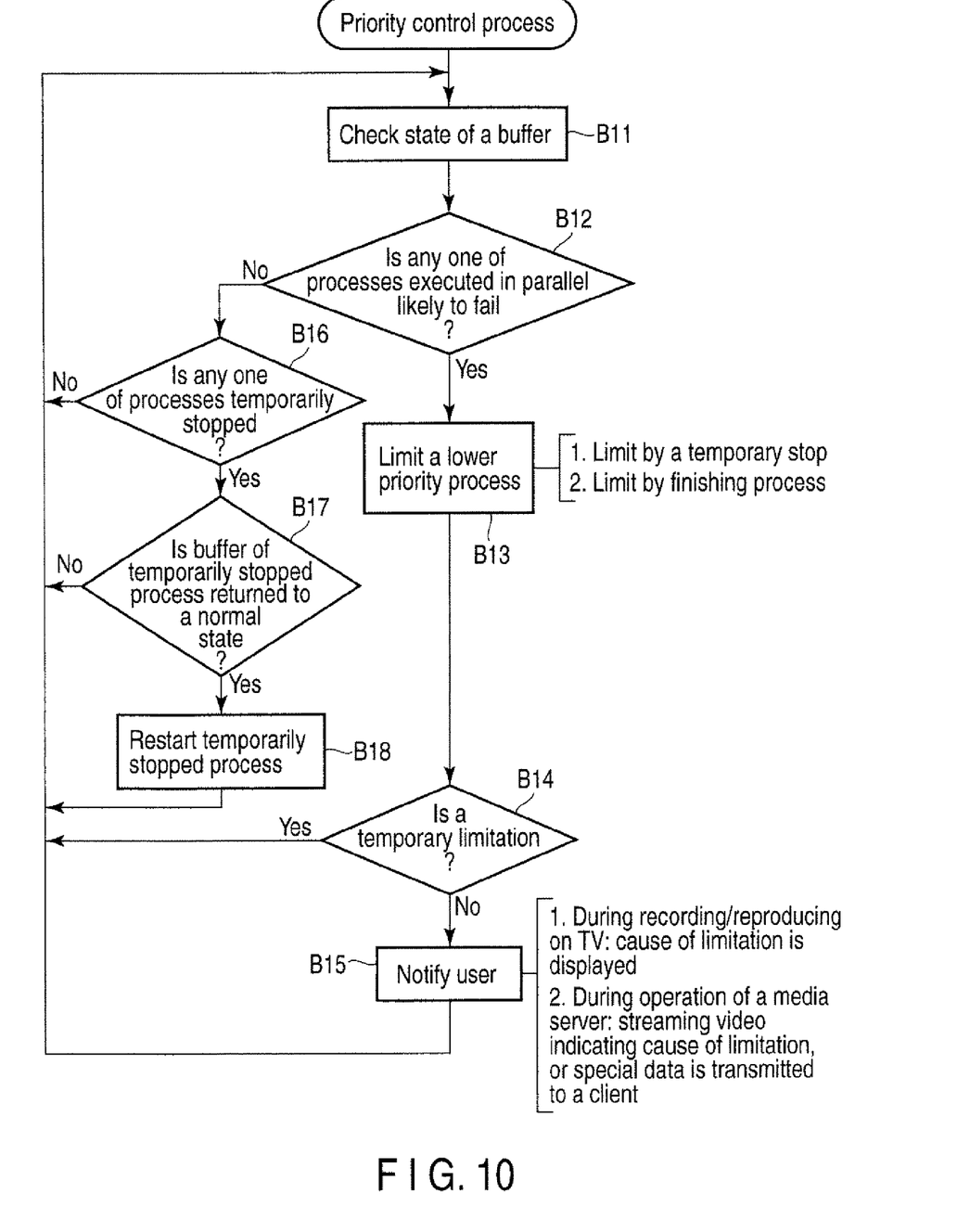
FIG. 10 is an exemplary diagram showing a flowchart of priority control when plural kinds of content processing shown in FIG. 3 are executed simultaneously and in parallel.

FIG. 10 shows a flowchart of priority control in simultaneous parallel execution of plural kinds of content processing. The priority control is executed by the CPU 261P when plural kinds of content processing are executed simultaneously and in parallel. In the priority control, the states of the buffers BF1, BF2 and BF3 are checked in block B11. In block B12, whether any one of the kinds of content processing executed simultaneously and in parallel is likely to fail. Overflow of the recording buffer BF1, and underflow of the reproducing buffer BF2 and transmission buffer BF3 are regarded as processing likely to fail. When processing likely to fail is detected, as the load of the CPU 261P is increased, lower priority processing is limited in block B13. If the limited content processing permits a temporary stop, the processing is limited by a temporary stop. If the limited content processing does not permit a temporary stop, the processing is limited by finishing the processing. Thereafter, whether the limitation is caused by a temporary stop is checked in block B15. If the limitation is caused by a temporary stop, the priority control process is returned to block 11. If the limitation is caused by termination of the processing, this is notified to the user in block 815. The cause of the limitation is displayed on the image display unit 114, if processing is limited during recording or reproducing on the TV 111. If processing is limited during operation of a media server, a streaming video indicating the cause of the limitation, or special data is sent to a client. After block B15, the priority order control is returned to block 11.

If no processing is likely to fail as a result of checking the states of the buffers in blocks B11 and B12, whether any process is temporarily stopped in block B16 is checked. If no process is temporarily stopped, the priority control processing is returned to block 11. If any process is temporarily stopped, whether the buffer used for this processing is returned to a normal state is checked in block B17. Here, a normal state means that free space is generated in the recording buffer BF1, and no free space is generated in the reproducing buffer BF2 or transmission buffer BF3. If the buffer is not returned to a normal state, the priority control process is returned to block 11. If the buffer is returned to a normal state, the process temporarily stopped in block B18 is restarted, and the priority control process is returned to block 11.

in the embodiment descried above, an order of priority is set for plural kinds of content processing, content processing is limited sequentially from lower priority processing, as load increases and disables simultaneous parallel execution of plural kinds of content processing. As the load is decreased by this limitation, failure of processing can be avoided.

The invention is not limited to the embodiments described herein. The invention may be modified in other various forms without departing from its essential characteristics.

In the embodiments described herein, a content processing apparatus has functions as a personal video recorder (PVR) and a media server, and is configured as a digital television broadcast receiver for simultaneous parallel execution of plural kinds of processing such as recording, reproducing, and movement of broadcast content, in cooperation with external devices. The invention is not limited to this form. For example, a content processing apparatus may be incorporated in a DVD recorder connected to a display, for example.

The various modules of the systems described herein can be implemented as software applications, hardware and/or software modules, or components on one or more computers, such as servers. While the various modules are illustrated separately, they may share some or all of the same underlying logic or code.

While certain embodiments of the invention have been described, these embodiments have been presented by way of example only, and are not intended to limit the scope of the invention. Indeed, the novel methods and systems described herein may be embodied in a variety of the other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A content processing apparatus comprising:
an interface circuit connected to one or more external devices; and
a processor configured to execute simultaneously with recording to the one or more external devices and reproducing from the one or more external devices;
wherein the processor including a controller configured to set an order of priority so that the recording is higher than the reproducing, and limit processing operation of reproducing when the load of simultaneous execution of the recording and the reproducing exceed the load that the processor can process; and
wherein the controller is configured to give priority based on at least one of a plurality of parameters, including (i) a user specified device, (ii) a start timing of the operation, (iii) frequency of using an external device, and (iv) user specified program category, in handling same priority processing.

2. A content processing method of executing plural kinds of content processing to access one or more external devices that is connected to an interface circuit simultaneously and in parallel, the method comprising:
providing a processor adapted to simultaneously record content to the one or more external devices and reproduce content from the one or more external devices;
setting an order of priority for recording of content higher than reproducing of content;
limiting processing operation of reproducing when the load of simultaneous execution of the recording and the reproducing exceed the load that the processor can process; and
giving priority based on at least one of a plurality of parameters, including (i) a user specified device, (ii) start timing of the operation, iii frequency of using an external device, and (iv) user specified program category, in handling same priority processing.

* * * * *